United States Patent Office 3,399,413
Patented Sept. 3, 1968

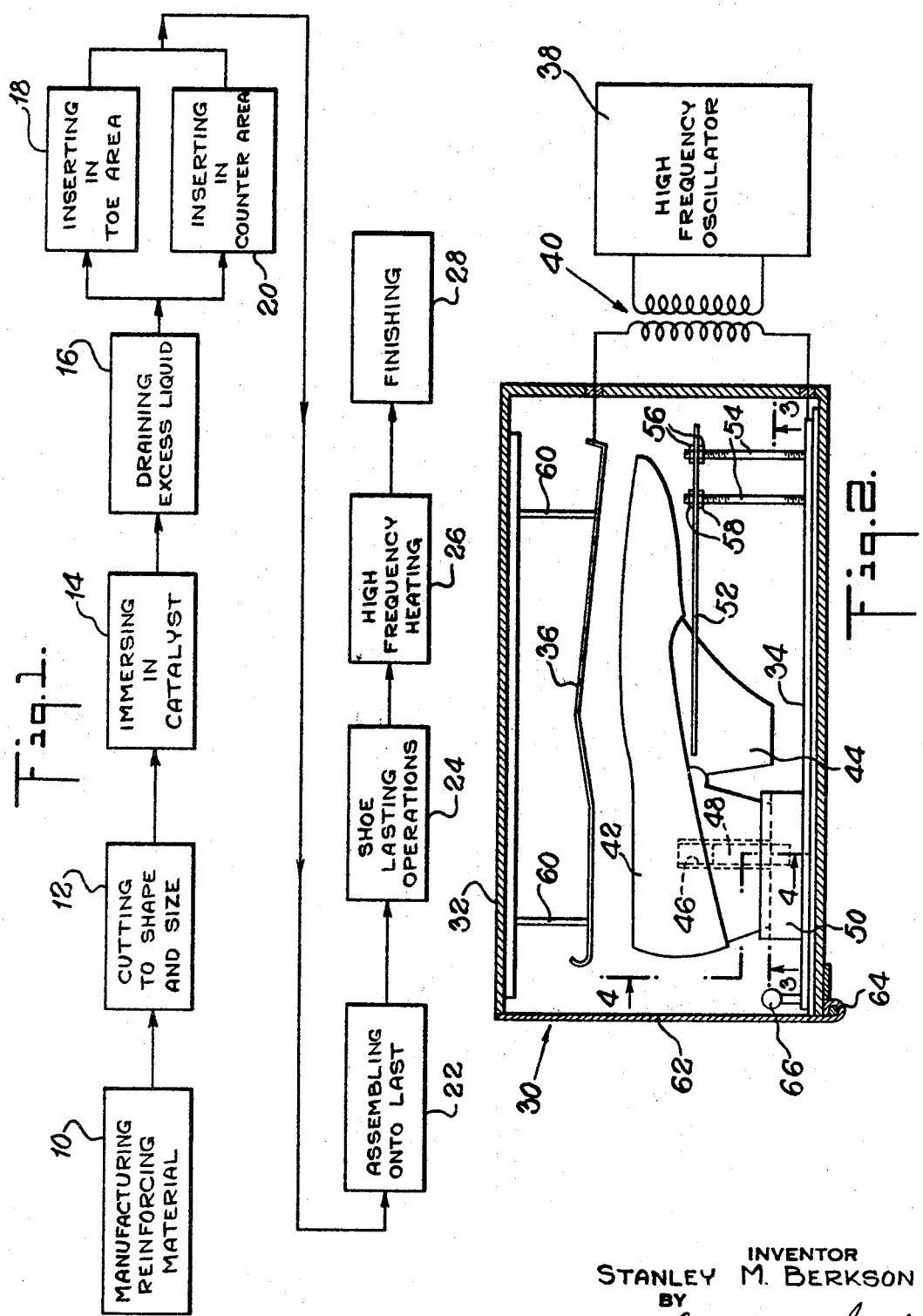

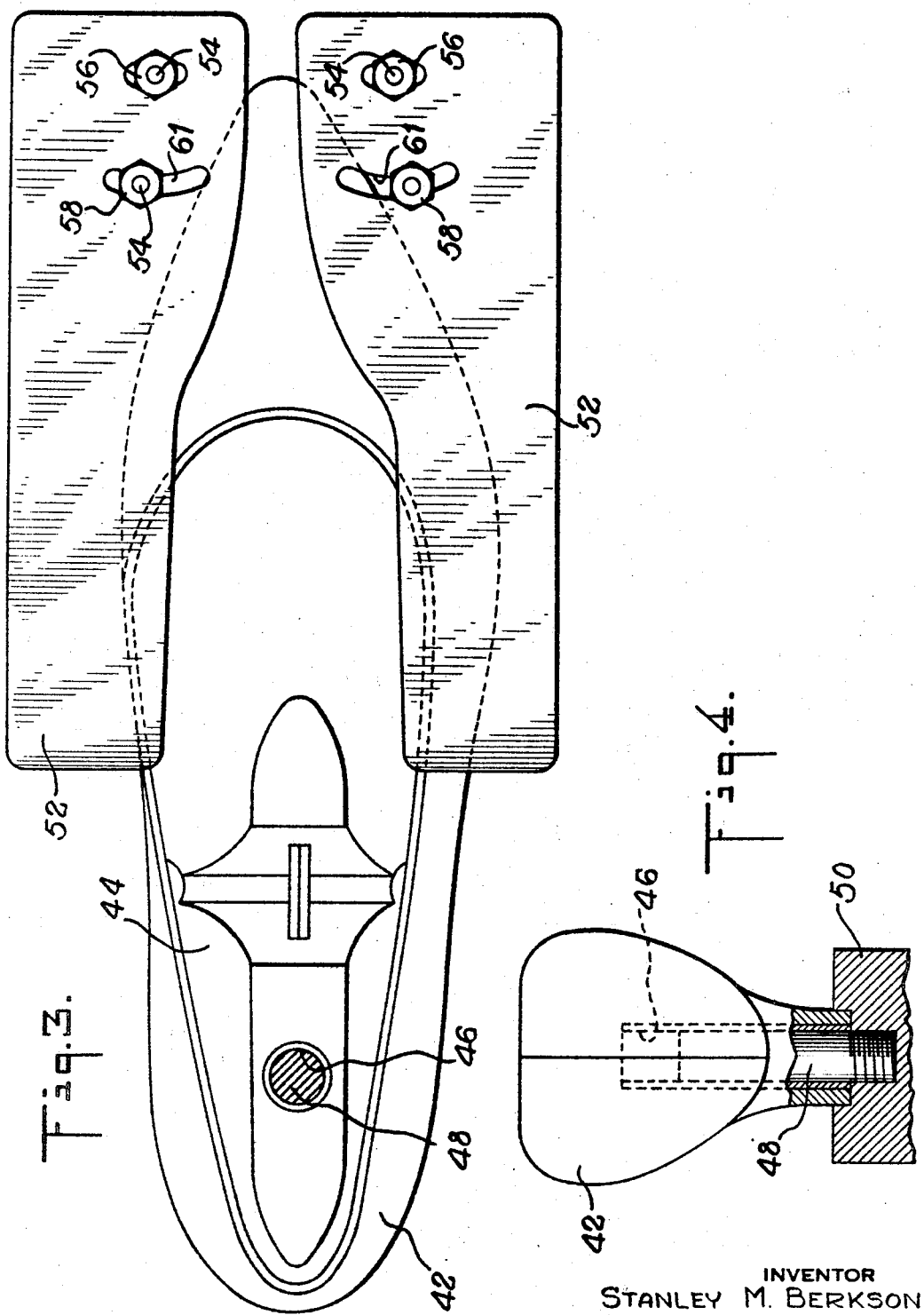

3,399,413
METHOD OF MANUFACTURING A SHOE UPPER
Stanley M. Berkson, Clifton, N.J., assignor to Stanbee Company, Inc., Hasbrouck Heights, N.Y., a corporation of New Jersey
Filed Aug. 8, 1966, Ser. No. 570,870
9 Claims. (Cl. 12—146)

ABSTRACT OF THE DISCLOSURE

A method of making a shoe upper by assembling a thermosetting-impregnated stiffener with an upper on a last and subjecting the assembled unit to high frequency heat above 70 megacycles, preferably at 78 megacycles. Prior to assembly, the stiffener is dipped into an activating catalyst solution of ammonium chloride and the excess catalyst removed.

---

The invention relates to a method of shoe manufacture and in particular to an improved method of bonding thermosetting-impregnated fabric stiffeners for the shoe counter and/or toe to the shoe upper.

Broadly, the invention is directed toward providing a method of bonding the thermosetting-impregnated fabric stiffeners to the shoe upper by means of high frequency heating. The high frequency waves set the thermosetting material very rapidly and at the same time dry and cure the counter and/or box toe. Additionally, the upper leather is also dried in the high frequency heater. Moreover, the method of the invention results in an increased hardness of the counter and/or box toe over prior art methods so that a lower ply, lighter weight material may be used.

The method of the invention does not require any specially shaped electrodes or jigs which make contact with the shoe and the system may be designed so that the lasts supporting the shoes being manufactured may be fed to the high frequency heater on trays, moving conveyors or similar devices. The method of the invention differs from prior art methods of shoe manufacture using high frequency heaters in this important aspect. Furthermore, the method of the invention is limited to use with thermosetting-impregnated counters and/or box toes since I have found that the method has no effect on counters and/or box toes which are impregnated with thermoplastic material.

The thermosetting material is such that it sets and cures when heat is applied. It does not re-soften when it is subjected to lower temperatures. Thermoplastic material sets when the temperature is lowered and softens when it is subject to an elevated temperature. Both the thermosetting and the thermoplastic materials are referred to, in the trade, as adhesives and serve to bond the stiffener to the upper as the material dries and cures. However, it must be noted that thermoplastic materials cannot be set using the method of the invention.

It is an important object of the invention to provide a method of shoe manufacture wherein a thermosetting-impregnated stiffener is rapidly cured and bonded to the upper.

It is a further object of the invention to provide such a method which includes subjecting the thermosetting-impregnated stiffener and the upper to high frequency heat.

It is a still further object of the invention to provide such a method wherein the frequency of the high frequency heater is above about 70 megacycles.

These and other objects, features, advantages and uses will be apparent during the course of the following description when taken with the accompanying drawings wherein:

FIGURE 1 is a block diagram showing the process of manufacture utilizing the method of the invention;

FIGURE 2 is a diagrammatic, elevational view, partly in section, showing the high frequency heating of a lasted shoe assembly in accordance with the invention;

FIGURE 3 is an enlarged, sectional view taken on the lines 3—3 of FIGURE 2, viewed in the direction of the arrows; and FIGURE 4 is an enlarged, sectional view taken on the lines 4—4 of FIGURE 2, viewed in the direction of the arrows.

In the drawings, wherein, for the purpose of illustration, are shown the steps of the method and a preferred embodiment of apparatus for practicing the invention, the numeral 10 designates the step of manufacturing the reinforcing material, commonly called stiffeners.

The stiffeners can be of a single ply of fabric and a single layer of thermosetting adhesive material or they may be formed of several plies of fabric interlined with the thermosetting adhesive material. For the purpose of this specification, this construction, after activation, is referred to as "thermosetting-impregnated" and the stiffeners are referred to as "thermosetting-impregnated stiffeners."

The thermosetting material is comprised of a large percentage of partially condensed urea formaldehyde, a small percentage of acrylic resins, and fillers such as kaolin clay. The stiffeners are assembled in a manner well-known in the art and are pliable at this stage.

The assembled stiffeners are cut to shape and size, step 12, into the form of box toes and counters. Next, at step 14, the cut shapes are immersed in a catalyst for activation. The catalyst is a salt solution principally of ammonium chloride.

At step 16, the excess liquid is drained off and the thermosetting-impregnated stiffener is ready to be inserted in contact with the upper toe area, step 18, or in the counter area, step 20. The counters are usually inserted in a pocket formed in the shoe upper. However, a one piece sueded or vinyl faced counter may be used, in which case, it is affixed to the inside of the upper at the heel area. The box toe, thermosetting-impregnated stiffener is usually inserted between the lining and the shoe upper in the toe area.

The combination of the upper and stiffeners is now assembled onto a last, step 22, in a manner well-known in the art. Next, the shoe is lasted, step 24, at which time, the various procedures of applying tacks and/or cement to attach the insole to the upper are accomplished.

Now, the partially assembled shoe on the last is inserted in the high frequency heater, step 26. Ideally, the frequency of the heater should be between 70 and 100 megacycles and I have found that a frequency of 78–82 megacycles at a power of 7.5 kw. will completely dry and cure the thermosetting material and dry normally mulled uppers of four shoes simultaneously in about 15 seconds. I have found that the frequency drops about 3 megacycles under load.

Next, the shoe is removed from the heater and the manufacturing process is completed and the shoe is finished, step 28. In the finishing process, the heel and sole are installed and the shoe is removed from the last and made ready for boxing and shipping.

In FIGURE 2, there is illustrated a diagrammatic, elevational view, partly in section, of a high frequency heater used to carry out step 26 of the invention. The heater 30 comprises casing 32, lower electrode 34 and upper electrode 36, high frequency oscillator 38, and high frequency transformer 40 which is connected to casing 32 and electrode 36. High frequency oscillator 38 may be of any type well-known in the art and transformer 40 may be omitted under certain conditions. The electrode placement should be such that they are close enough to the shoe to produce rapid heating but not so close that arcing occurs and the shoe is burned or charred.

Shoe 42 is mounted on last 44 which is provided with an opening 46 to receive pin 48. Pin 48 is affixed to insulating block 50 which serves to hold the shoe in position in heater 30. Electrodes 52 are mounted on threaded studs 54 which are electrically conductive and also serve to make the connections between electrodes 52 and electrode 34. Nuts 56 and 58 are loosened in order to move electrodes 452 vertically and to pivot them in slots 61, as required. Nuts 56 and 58 are tightened to hold electrodes 52 in the desired positions.

I have found that much better results are obtained when the electrodes are adjustable so that the spacing is maximized for each type, shape and size of shoe. It should be noted that electrode 36 is insulated from casing 32 by means of insulated supports 60 so that the radio frequency energy passes between the electrode 36 and electrodes 34 and 52 which are electrically connected to the casing. The spacing must be such that the energy passes through the shoe and not through some other path. Electrode 36 may be moved up and down on supports 60 to help obtain proper spacing (details not shown).

To facilitate the carrying out of the method of my invention, heater 30 is provided with door 62 which is hinged at 64 so that it may be opened easily. Handle 66 is affixed to electrode plate 34 to enable it to be slid out of the heater to enable the user to insert and remove shoes easily. The electrode 34 is in electrical contact with the casing 32 which is connected to one side of transformer 40. Heater 30 may be provided with a door interlock and/or an on-off timer to ensure that the tarnsmitter power is off when the door is open. These safety devices are common in the radio frequency art and therefore the details are not shown.

In operation, door 62 is opened, the assembly is moved out by means of handle 66 and shoes 42 are inserted in the heater by placing lasts 44 on pegs 48. The electrodes 52 are adjusted vertically and horizontally and electrode 36 is fixed at the desired height for the shoes being processed. The plate 34 is pushed back into heater 30 and the switch (either manual or timer) is turned on. When the shoes have been in the heater for the required time, it is turned off and they are removed to make the heater ready for the next shoes. A plurality of shoes or a single shoe may be inserted in the heater depending upon the capacity of the heater. Moreover, the heater may be constructed over a conveyor so that the shoes are carried into and out of the heater on the conveyor.

I have also found that the high frequency heating used to set the thermosetting-impregnated stiffeners will also dry the leather of the shoe upper very rapidly. Since moisture in the leather enables one to set the leather better, it is within the contemplation of the invention to presteam the upper on the last in a steamer for 30 seconds or less prior to using the high frequency heater.

Since, on occasion, moisture will collect on the last and stain the shoe, I have employed the following method to avoid this effect: applying a vacuum to the interior of the heater to draw off the collecting moisture.

It should also be noted that the teachings of the invention may be utilized in conjunction with other methods of shoe manufacture depending upon the particular piece being produced. While a particular embodiment of the invention has been shown and described, it is apparent to those skilled in the art that modifications are possible without departing from the spirit of the invention or the scope of the subjoined claims.

What is claimed is:

1. The method of shoe manufacture which comprises:
   impregnating a fabric of at least one ply with thermosetting material;
   cutting the impregnated fabric to a desired shape and size;
   dipping the cut, impregnated fabric in an activating catalyst;
   removing any excess activating catalyst from the cut, impregnated fabric;
   cutting a pattern of a shoe upper of the desired shape and size;
   placing the cut, impregnated fabric in contact with the portion of the pattern of the shoe upper which is to be stiffer than the balance of the upper in the finished shoe;
   assembling the shoe upper and the cut, impregnated fabric on a last;
   placing the last with the shoe upper and the cut, impregnated fabric affixed thereto in a high frequency heater operating at a frequency above about 70 megacycles for a sufficient length of time so that the cut, impregnated fabric is dried and cured and bonded to the shoe upper.

2. The method of shoe manufacture as described in claim 1 wherein the thermosetting material is comprised of a large percentage of partially condensed urea formaldehyde, a small percentage of acrylic resins, and fillers.

3. The method of shoe manufacture as described in claim 2 wherein the activating catalyst comprises a salt solution principally of ammonium chloride.

4. The method of shoe manufacture as described in claim 3 wherein the frequency of the high frequency heater is in the range of about 70 to 100 megacycles.

5. The method of shoe manufacture as described in claim 3 wherein the frequency of the high frequency heater is of the order of 78 megacycles.

6. The method of shoe manufacture as described in claim 2 wherein the frequency of the high frequency heater is in the range of about 70 to 100 megacycles.

7. The method of shoe manufacture as described in claim 2 wherein the frequency of the high frequency heater is of the order of 78 megacycles.

8. The method of shoe manufacture as described in claim 1 wherein the frequency of the high frequency heater is in the range of about 70 to 100 megacycles.

9. The method of shoe manufacture as described in claim 1 wherein the frequency of the high frequency heater is of the order of 78 megacycles.

References Cited

UNITED STATES PATENTS

| | | | |
|---|---|---|---|
| 2,618,796 | 11/1952 | Brophy | 12—146 |
| 2,709,310 | 5/1955 | Crowell | 12—146 X |
| 2,730,481 | 1/1956 | Day | 12—146 |
| 3,076,987 | 2/1963 | Shuttleworth | 12—146 |

PATRICK D. LAWSON, *Primary Examiner.*